(12) United States Patent
Katou et al.

(10) Patent No.: US 7,992,074 B2
(45) Date of Patent: Aug. 2, 2011

(54) DECODING DEVICE

(75) Inventors: Yoshiaki Katou, Tokyo (JP); Koutarou Asai, Tokyo (JP); Tokumichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 882 days.

(21) Appl. No.: 11/988,240

(22) PCT Filed: Sep. 13, 2005

(86) PCT No.: PCT/JP2005/016810
§ 371 (c)(1),
(2), (4) Date: Jan. 3, 2008

(87) PCT Pub. No.: WO2007/032058
PCT Pub. Date: Mar. 22, 2007

(65) Prior Publication Data
US 2009/0125791 A1      May 14, 2009

(51) Int. Cl.
*H03M 13/00* (2006.01)
(52) U.S. Cl. ..................................... 714/776; 714/764
(58) Field of Classification Search ............. 375/240.03; 704/500; 725/41; 370/486; 714/776, 764
See application file for complete search history.

(56) References Cited

U.S. PATENT DOCUMENTS

| | | | |
|---|---|---|---|
| 5,715,008 A | | 2/1998 | Sekiguchi et al. |
| 6,697,427 B1 * | | 2/2004 | Kurak et al. ............. 375/240.03 |
| 6,782,368 B2 * | | 8/2004 | Fujii et al. ..................... 704/500 |
| 6,993,488 B2 * | | 1/2006 | Vainio et al. .................. 704/500 |
| 7,380,261 B2 * | | 5/2008 | Gordon et al. .................. 725/41 |
| 7,400,652 B2 * | | 7/2008 | Kim et al. ..................... 370/486 |

FOREIGN PATENT DOCUMENTS

| | | |
|---|---|---|
| CN | 1386369 A | 12/2002 |
| JP | 1-106580 A | 4/1989 |
| JP | 01-106580 A | 4/1989 |
| JP | 10-191025 A | 7/1998 |
| JP | 2000-138932 A | 5/2000 |
| JP | 2002-185332 A | 6/2002 |
| JP | 2002-223447 A | 8/2002 |
| JP | 2004-528752 A | 9/2004 |
| JP | 2005-198158 A | 7/2005 |
| WO | WO-02/071736 A2 | 9/2002 |

* cited by examiner

*Primary Examiner* — David Ton
(74) *Attorney, Agent, or Firm* — Birch, Stewart, Kolasch & Birch, LLP

(57) ABSTRACT

Even when erroneous encoded data is inputted to a decoding device, the decoding device is recovered during one video frame period including a video frame time of the inputted data to enable decoding processing on a next video frame. The decoding device includes: a receiving section (1) for receiving encoded data (11) to output the encoded data corresponding to a video frame, outputting encoded data of a next frame in response to a decoding completion signal (14) to be received, and for transmitting an error signal (15) when the decoding completion signal is not received during a predetermined time; an image decoder (2) for decoding the encoded data (12) from the receiving section (1), transmitting the decoding completion signal (14) to the receiving section (1) when decoding is completed, and for stopping decoding processing in response to a reset signal (16) to be received; and an error recovery section (3) for outputting the reset signal (16) to the image decoder (2) when the error signal (15) is received.

7 Claims, 4 Drawing Sheets ns

US 7,992,074 B2

DECODING DEVICE

TECHNICAL FIELD

The present invention relates to a decoding device for decoding encoded image data and displaying the image data.

BACKGROUND ART

In recent years, along with rapid advances of digital image compression (encoding) techniques represented by MPEG and JPEG, it has become possible to efficiently transmit and receive a high-quality video image with a small information amount in real time. Even in a case of transmission of image data, an advancement of a digital modulation and demodulation technique enables high-speed digital communications using a satellite or an optical fiber. In addition, even in storage media, a large-capacity hard disk, a large-capacity DVD, and the like have been developed, and environments for a digital image to be transmitted or stored are being provided.

Encoded data (bit stream, bit string) compressed at high efficiency is sensitive to an error, so the data is protected by an error correction technique against a transmission line error or a read error from a storage medium. However, an error rate cannot be completely reduced to zero, so an error remains in the data. When the encoded data including the error is to be decoded to a decoded image, there is a case where, even if the error is 1 bit, a decoded image is significantly influenced thereby. Therefore, in order to reduce the influence of the error on the decoded image, an error concealment technique for minimizing the error has been known and a method of replacing an error generation portion by a normal image or a gray image has been proposed (see, for example, Patent Document 1

Patent Document 1: JP 2004-528752 A (pages 14 to 17 and FIG. 3)

DISCLOSURE OF THE INVENTION

Problems to be Solved by the Invention

In a conventional image decoding device, when encoded image data including an error is inputted to a decoder, the encoded image data is decoded to an erroneous value in a series of processing procedures such as variable length decoding processing including lookup table mapping and motion vector decoding, inverse quantization processing, and inverse Discrete Cosine Transform (DCT) processing. In some cases, the decoder enters an infinite processing loop. As a result, a problem occurs in which an erroneous image is decoded and decoding processing is never completed.

The present invention has been made to solve the problems described above, and there is realized a decoding device, in which, even when erroneous encoded data is inputted to the decoding device, the decoding device is recovered during one video frame period including a video frame time of the inputted data to enable decoding processing on a next video frame, thereby minimizing the influence of an error of the encoded data.

In order to realize the above-mentioned object, a decoding device according to the present invention includes: receiving means for receiving encoded data to output the encoded data corresponding to a video frame, outputting encoded data of a next frame in response to a decoding completion signal to be received, and for transmitting an error signal when the decoding completion signal is not received during a predetermined time; decoding means for decoding the encoded data from the receiving means, transmitting the decoding completion signal to the receiving means when decoding is completed, and for stopping decoding processing in response to a reset signal to be received; and error recovery means for outputting the reset signal to the decoding means when the error signal is received.

Effects of the Invention

According to the decoding device in the present invention, the error recovery means for recovering a decoding operation of an image decoder during a period of one video frame is provided. Therefore, there is an effect that, even when the encoded data includes an error, the number of video frames influenced thereby can be minimized to rapidly maintain a normal decoding operation.

BEST MODE FOR CARRYING OUT THE INVENTION

Embodiment 1

Figure 1:
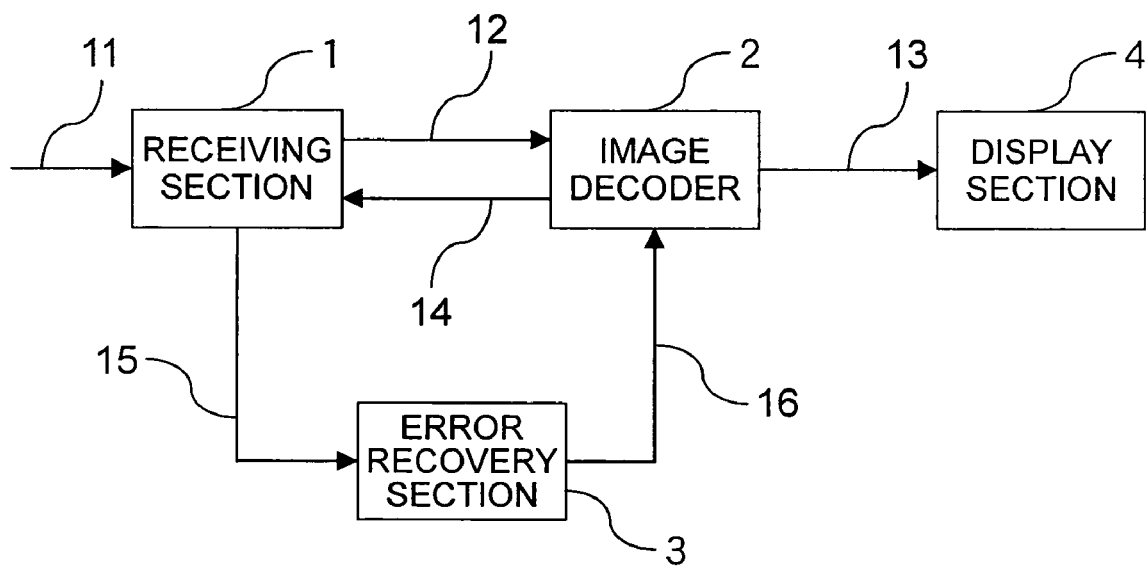
FIG. 1 is a structural diagram showing a decoding device according to Embodiment 1 of the present invention.

FIG. 1 is a block diagram showing a structure of a decoding device according to Embodiment 1 of the present invention. The decoding device shown in FIG. 1 includes a receiving section 1 for receiving encoded data 11 from a network or a storage medium, an image decoder 2 serving as a decoding means for decoding encoded data 12 from the receiving section 1, an error recovery section 3 for causing the image decoder 2 to operate again, and a display section 4 for displaying an image obtained by decoding by the image decoder 2 on a display, a projector, or the like.

Next, an operation will be described.

The encoded data 11 from a network or a storage medium such as a hard disk is inputted to the receiving section 1 and temporarily buffered in a memory or the like in an inner portion of the receiving section 1. The encoded data 12 corresponding to a video frame from the receiving section 1 is read out and inputted to the image decoder 2. A decoded image frame 13 obtained by decoding by the image decoder 2 is displayed by the display section 4. When the encoded data is intraframe encoded data such as a JPEG (motion JPEG) or MPEG intraframe, the video frame can be obtained by decoding only the encoded data corresponding to one video frame.

When the decoding of the encoded data 12 corresponding to one video frame which is received from the receiving section 1 is completed, the image decoder 2 transmits a decoding completion signal 14 to the receiving section 1. Upon receiving the decoding completion signal 14, the receiving section 1 outputs the encoded data 12 corresponding to a next frame to the image decoder 2. When the decoding completion signal 14 cannot be received during a predetermined time, the receiving section 1 transmits an error signal

15 to the error recovery section 3. The error recovery section 3 outputs a decoder reset signal 16 to the image decoder 2 in response to the error signal 15. The image decoder 2 stops a decoding processing operation of the encoded data 12 in response to the inputted decoder reset signal 16 in preparation for the input of the next encoded data 12.

Figure 2:
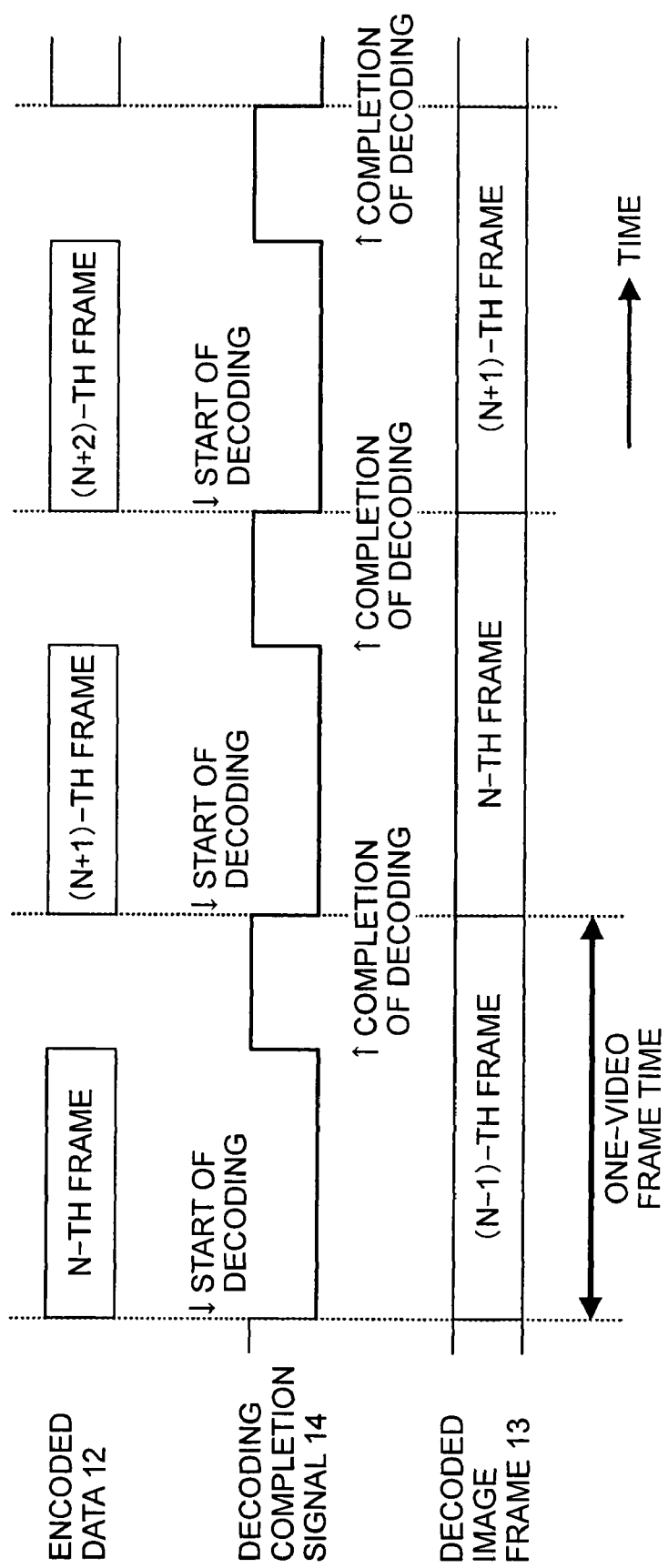
FIG. 2 is an explanatory diagram showing input and output signals of an image decoder 2 shown in FIG. 1.

FIG. 2 shows the passage of time on the encoded data 12, the decoding completion signal 14, and the decoded image frame 13 which are the input and output signals of the image decoder 2. The abscissa indicates a time axis divided by a video frame time unit. In FIG. 2, when encoded data corresponding to one video frame which is an N-th frame is inputted as the encoded data 12 to the image decoder 2, the image decoder 2 starts decoding, so the decoding completion signal 14 is turned off. At this time, a video image of an (N−1)-th frame preceded by one video frame is outputted as the decoded image frame 13 from the image decoder 2 for one video frame time. The one-video frame time is the reciprocal of the number of video frames per second. For example, in a case of 24 video frames per second, the one-video frame time becomes approximately 41.67 milliseconds.

When the decoding of the N-th frame is completed in the image decoder 2, the decoding completion signal 14 is turned on and held in the on state until next encoded data of an (N+1)-th frame is inputted to start the decoding. Because the decoding completion signal 14 is turned on, the receiving section 1 recognizes that the image decoder 2 normally decodes the encoded data 12 of the N-th frame. At a next video frame time, the encoded data 12 of the (N+1)-th frame is outputted to the image decoder 2. When the encoded data 12 includes no error and thus the decoding is normally completed, the image decoder 2 repeats such an operation at video frame time intervals.

Figure 3:
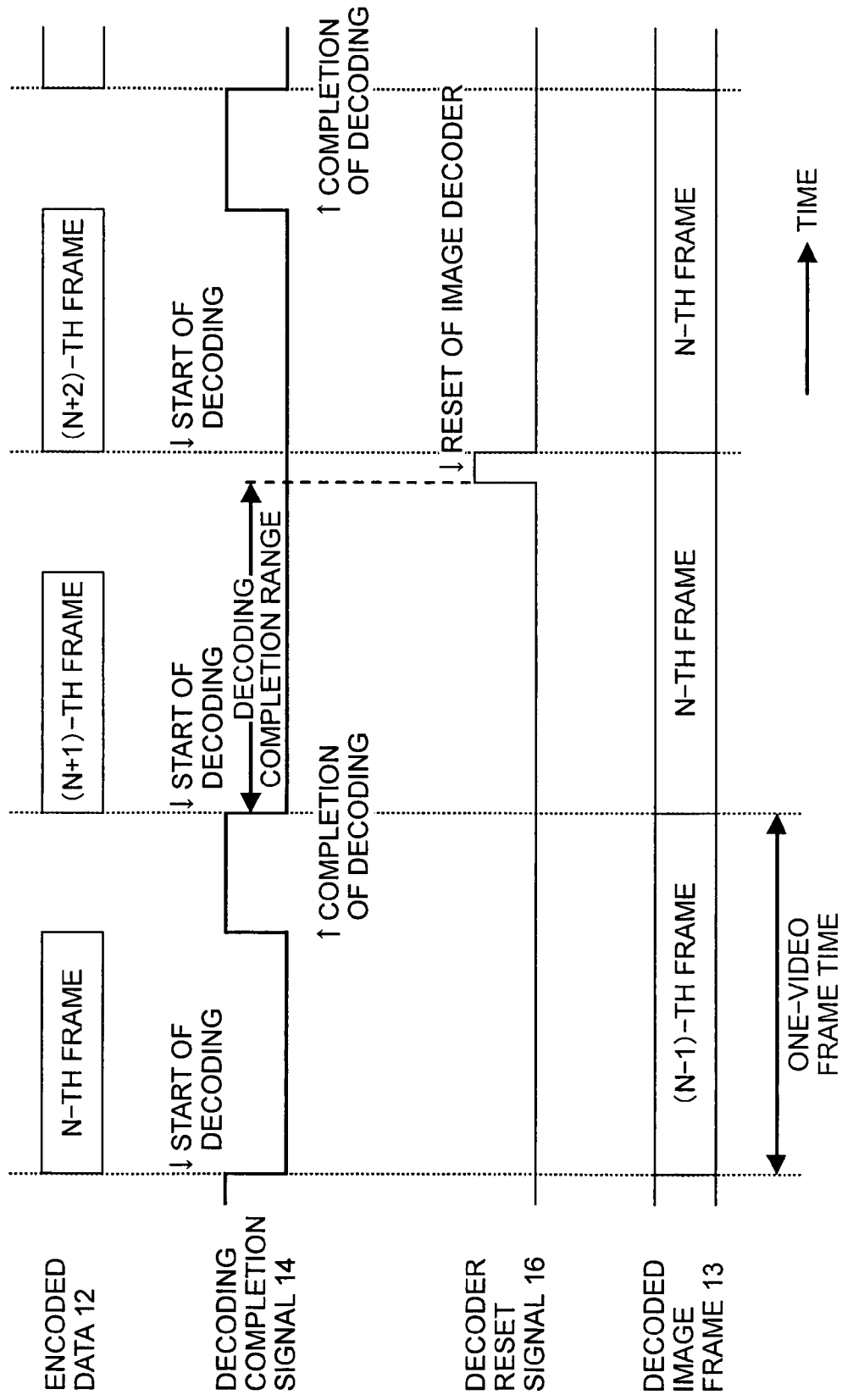
FIG. 3 is an explanatory diagram showing input and output signals of the image decoder 2 shown in FIG. 1 in a case where encoded data includes an error.

FIG. 3 shows an example of the passage of time on the input and output signals of the image decoder 2 in a case where the encoded data 12 includes an error or an abnormality, so decoding processing is not normally completed and thus the decoding completion signal 14 is not outputted. In FIG. 3, in the case where the encoded data 12 of the (N+1)-th frame includes an error and thus cannot be normally decoded, even when the input of the encoded data of the (N+1)-th frame is completed, the decoding completion signal 14 indicating the completion of the decoding is not turned on. When the decoding completion signal 14 is not turned on during the predetermined time of a decoding completion range, the receiving section 1 transmits the error signal 15 to the error recovery section 3 as described above. When the error signal 15 is inputted, the error recovery section 3 outputs the decoder reset signal 16 as shown in FIG. 3 to the image decoder 2 to recover the image decoder 2 from an error state.

The image decoder 2 forcedly terminates a decoding circuit and processing in response to the inputted decoder reset signal 16 in preparation for the decoding of the next encoded data 12 of an (N+2)-th frame. In addition, the image decoder 2 outputs, during a next video frame time, the image frame 13 of the N-th frame which is normally obtained by immediately preceding decoding instead of a decoded image frame of the (N+1)-th frame which cannot be obtained by decoding. Therefore, when the decoding is not completed, the image decoder 2 is reset during the one-video frame time, so the number of image frames influenced by the error can be minimized.

In particular, in a digital cinema representation system, encoded data which is obtained by real time transmission or read out from a storage medium is decoded and displayed on a large screen by a movie projector. Therefore, even when the encoded data includes an error, there is an effect in view of the necessity of rapid recovery to minimize the influence on image quality and reduce an influence time to a shortest time.

The example of the image decoder for decoding the image is described. When decoding completion checking within an audio frame time or a text frame time and decoder reset processing for the occurrence of trouble are performed on an audio decoder or a decoder for text data such as subtitles, the same effect is obtained in which an error recovery time can be minimized.

According to Embodiment 1, the decoding device includes the error recovery section 3 for monitoring the decoding completion signal from the image decoder 2 for each video frame and generating the reset signal for recovering the operation of the image decoder 2 when the decoding is not completed during the predetermined time within the one-video frame time. Therefore, even when the encoded data includes an error, the image decoder 2 can be recovered during the one-video frame time to perform decoding processing on a next video frame. Thus, there is an effect that a recovery time of the image decoder 2 which is in the error state can be shortened.

When the decoder reset signal 16 is inputted from the error recovery section 3, the image decoder 2 stops the decoding of the encoded data and outputs a screen normally obtained by immediately preceding decoding as the decoded image. Therefore, when there is an error, the screen normally obtained by decoding can be displayed instead of an error screen, with the result that there is an effect capable of covering the occurrence of the error.

Embodiment 2

When the error of the encoded data 11 or a data loss thereof is detected by the receiving section 1 described in Embodiment 1, the error signal 15 can be generated without outputting the encoded data 12 of a video frame including the error or the data loss to the image decoder 2.

Figure 4:
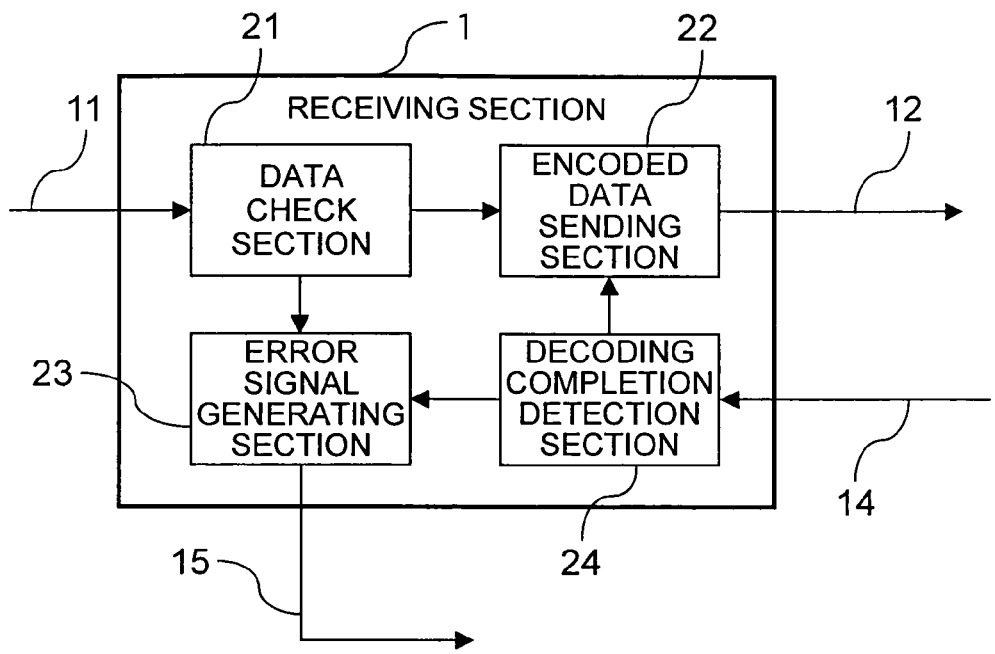
FIG. 4 is a block diagram showing an example of an internal structure of a receiving section 1 shown in FIG. 1.

FIG. 4 is a block diagram showing an example of an internal structure of the receiving section 1.

The receiving section 1 shown in FIG. 4 includes a data check section 21 for detecting the data loss of the inputted encoded data 11 or the error thereof, an encoded data sending section 22 for outputting the encoded data 12 corresponding to a video frame based on the input of error-free encoded data which is inputted through the data check section 21, an error signal generating section 23 for generating the error signal 15 based on a detection signal outputted from the data check section 21 when the error of the encoded data 11 is detected and a signal outputted from a decoding completion detection section 24 when the decoding is not completed during a predetermined time within a video frame time, and the decoding completion detection section 24 for, when the decoding is not completed during the predetermined time within the video frame time while the decoding completion signal 14 is expected to be inputted from the image decoder 2, issuing a signal to the error signal generating section 23 and outputting a signal to the encoded data sending section 22 to stop an output to the image decoder 2.

Next, an operation will be described.

The encoded data 11 which is transmitted from a network or read out from a storage medium is subjected to data loss detection and error detection by the data check section 21.

Examples of a method for the detection include a method of checking the continuity of sequence numbers assigned to header portions of the encoded data 11 stored in a packet to determine the presence or absence of a loss in packet unit and a method of detecting a bit error by cyclic redundancy check (CRC) or parity check.

In the data check section 21, when the encoded data includes no error, the encoded data is sent to the encoded data sending section 22. The encoded data 12 corresponding to the video frame is sent from the encoded data sending section 22 to the image decoder 2. On the other hand, when the error of the encoded data 11 is detected, the detection signal is sent to the error signal generating section 23. The error signal 15 is sent from the error signal generating section 23 to the error recovery section 3. The decoding completion signal 14 from the image decoder 2 is inputted to the decoding completion detection section 24. When the decoding is not completed during the predetermined time within the video frame time, the signal is issued to the error signal generating section 23 and the error signal 15 is sent to the error recovery section 3.

Therefore, when the error of the encoded data 11 or the loss thereof is detected in the inner portion of the receiving section 1, the encoded data including the error is prevented from being sent to the image decoder 2, so the recovery of decoding processing can be made without causing an image decoder error.

When the encoded data 11 is encrypted, a decryption section is provided in the subsequent stage of the data check section 21. When a decryption error occurs in a decryption process, an error notice signal is issued to the error signal generating section 23 and the error signal 15 is sent to the error recovery section 3. Therefore, even when the encoded data 11 is encrypted, the same effect can be obtained.

Thus, according to Embodiment 2, the receiving section 1 detects the occurrence of the error or the data loss of the inputted encoded data 11 to output the error signal 15 to the error recovery section 3 and stop the output of the encoded data 12 to the image decoder 2, so there is an effect that the error recovery can be made earlier than the occurrence of the error of the image decoder 2.

Embodiment 3

Whether or not the image decoding is normally completed without even one-bit error in the image decoder 2 in Embodiment 1 as described above may be determined using an electronic watermark for authenticity verification.

Figure 5:
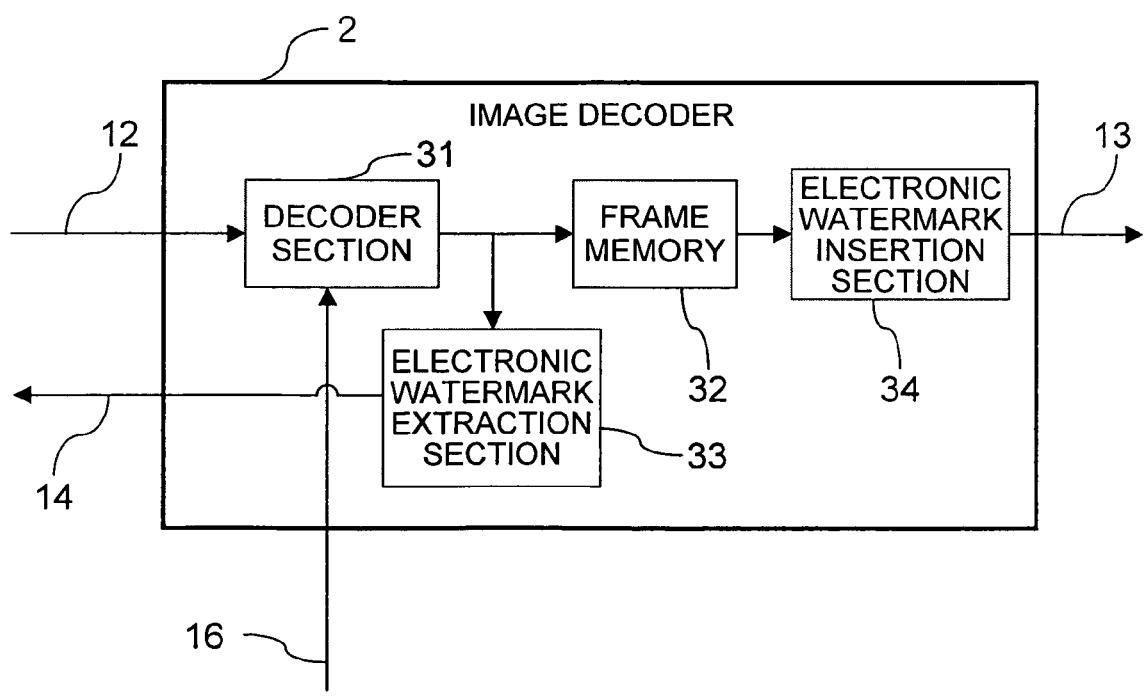
FIG. 5 is a block diagram showing an example of an internal structure of the image decoder 2 shown in FIG. 1.

FIG. 5 is a block diagram showing an example of an internal structure of the image decoder 2.

The image decoder 2 shown in FIG. 5 includes a decoder section 31 for performing decoding processing on the inputted encoded data 12 corresponding to a video frame and outputting decoded image data obtained by decoding processing, a frame memory 32 for storing the decoded image data, an electronic watermark extraction section 33 for extracting an electronic watermark for authenticity verification from the decoded image data and checking whether or not the decoded image data is altered, and an electronic watermark insertion section 34 for inserting copyright information (copyright holder, screen day and time, screen place, and the like) as the electronic watermark to the decoded image data 13 in order to perform tracking in a case where unauthorized use is made in a transmission process to the display section 4 such as a projector.

Next, an operation will be described.

The encoded data 12 corresponding to the video frame is inputted to the decoder section 31 and subjected to a series of decoding processings including variable length decoding, inverse quantization, and inverse DCT, and the creation of the decoded image by the decoder section 31. The decoded image data obtained by decoding is sent to the frame memory 32 and inputted to the electronic watermark extraction section 33.

The electronic watermark extraction section 33 extracts the electronic watermark for authenticity verification from the decoded image data and checks whether or not the decoded image is altered. Assume that the encoding is reversible encoding in which original image data in which the electronic watermark for authenticity verification is embedded can be completely decoded. When the electronic watermark for authenticity verification can be extracted only in a case where the decoded image data identical to the original image data without even one-bit difference is obtained by decoding, whether or not normal decoding can be performed without even one-bit difference can be determined. When the electronic watermark extraction section 33 determines that the normal decoding can be performed, the decoding completion signal 14 is sent to the receiving section 1.

In order to prevent the decoded image data from being illegally leaked between the image decoder 2 and the display section 4, the image data is encrypted and transmitted. However, in order to be able to track a leakage path and day-and-time in the event of leakage, the copyright information (copyright holder, screen day and time, screen place, and the like) is inserted as the electronic watermark to the decoded image data 13 by the electronic watermark insertion section 34.

In Embodiment 3, the method of extracting the electronic watermark from the decoded image data is described. When irreversible encoding is performed in the encoding process, the original image data is reconstructed, so the electronic watermark for authenticity verification cannot be extracted. However, when the embedding of the electronic watermark is used for an encoded domain of image data (for example, embedding of watermark data for DCT coefficients), the same effect can be obtained.

According to Embodiment 3, the image decoder 2 includes the electronic watermark extraction section 33 for outputting the decoding completion signal to the receiving section 1 based on the extraction of the electronic watermark embedded in the decoded image. The electronic watermark for authenticity verification is extracted from the decoded image. Therefore, the watermark information can be correctly extracted, so the normal completion of decoding can be verified.

The summary of the invention is as follow.

The decoding device according to the present invention is characterized by including the error recovery means for monitoring the decoding completion signal from the image decoder for each video frame and issuing the reset signal for recovering the operation of the image decoder when the decoding is not completed during the predetermined time within the one-video-frame time. Therefore, even when the decoded data includes the error, the image decoder is recovered during the one-video frame time, so a next video frame can be subjected to decoding processing.

In the decoding device according to another embodiment of the present invention, the image normally obtained by immediately preceding decoding is outputted as the decoded image from the image decoder in response to the reset signal from the error recovery means. Therefore, the output of a video frame including a decoding error can be prevented.

In the decoding device according to another embodiment of the present invention, the error of the encoded data or the loss thereof is detected in the receiving means located in the preceding stage of the image decoder, for receiving the encoded data. Therefore, erroneous encoded data can be prevented from being transmitted to the image decoder.

In the decoding device according to another embodiment of the present invention, information indicating whether or not the video frame can be normally decoded by the image decoder is recorded or outputted to an outside. Therefore, the decoding processing operation can be determined later.

In the decoding device according to another embodiment of the present invention, the embedded electronic watermark is extracted. Therefore, whether or not the decoding can be normally performed can be determined.

The invention claimed is:

1. A decoding device, comprising:
receiving means for receiving encoded data to output the encoded data corresponding to a video frame, outputting encoded data of a next frame in response to a decoding completion signal to be received, and for transmitting an error signal when the decoding completion signal is not received during a predetermined time;
decoding means for decoding the encoded data from the receiving means, transmitting the decoding completion signal to the receiving means when decoding is completed, and for stopping decoding processing in response to a reset signal to be received; and
error recovery means for outputting the reset signal to the decoding means when the error signal is received.

2. The decoding device according to claim 1, wherein when the reset signal is inputted from the error recovery means, the decoding means stops decoding of the encoded data and outputs a screen normally obtained by immediately preceding decoding as a decoded image.

3. The decoding device according to claim 1, wherein when an occurrence of one of an error and a data loss of the encoded data which is inputted is detected, the receiving means outputs the error signal to the error recovery means and stops an output of the encoded data to the decoding means.

4. The decoding device according to claim 3, wherein the receiving means includes
a data check section for detecting one of the error and the data loss of the inputted encoded data,
an encoded data sending section for outputting the encoded data corresponding to a video frame based on an input of encoded data which is inputted through the data check section,
an error signal generating section for generating the error signal based on a detection signal generated when one of the error and the data loss of the encoded data inputted to the data check section is detected and a signal from a decoding completion detection section when the decoding is not completed during a predetermined time within a video frame time, and
a decoding completion detection section for, when the decoding is not completed during the predetermined time within the video frame time while the decoding completion signal is expected to be inputted from the decoding means, issuing a signal to the error signal generating section and outputting a signal to the encoded data sending section to stop the output to the decoding means.

5. The decoding device according to claim 1, wherein the decoding means outputs the decoding completion signal to the receiving means based on an extraction of an electronic watermark embedded in a decoded image.

6. The decoding device according to claim 5, wherein the decoding means comprises
a decoding section for decoding the encoded data corresponding to the video frame, which is inputted, and for outputting decoded image data obtained by the decoding,
a frame memory for storing the decoded image data from the decoding section, and
an electronic watermark extraction section for outputting the decoding completion signal to the receiving means based on an electronic watermark for authenticity verification which is extracted from the decoded image data outputted from the decoder section.

7. A decoding device according to claim 6, wherein the decoding means further comprises an electronic watermark insertion section for inserting copyright information as the electronic watermark to the decoded image data from the frame memory and outputting resultant image data as a decoded image frame.

* * * * *